United States Patent
Hartley et al.

(10) Patent No.: US 9,569,701 B2
(45) Date of Patent: Feb. 14, 2017

(54) INTERACTIVE TEXT RECOGNITION BY A HEAD-MOUNTED DEVICE

(71) Applicant: International Business Machines Corporation, Armonk, NY (US)

(72) Inventors: John C. Hartley, Round Rock, TX (US); Puthukode G. Ramachandran, Austin, TX (US); Richard S. Schwerdtfeger, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 14/640,517

(22) Filed: Mar. 6, 2015

(65) Prior Publication Data

US 2016/0259996 A1    Sep. 8, 2016

(51) Int. Cl.
*G06K 9/72* (2006.01)
*H04N 5/225* (2006.01)
(Continued)

(52) U.S. Cl.
CPC . *G06K 9/72* (2013.01); *G06F 3/16* (2013.01); *G10L 13/08* (2013.01); *H04N 5/2253* (2013.01); *H04N 5/23222* (2013.01)

(58) Field of Classification Search
USPC ....... 382/104, 209, 218, 224, 229, 279, 290, 382/171, 278, 282; 348/14.02, 14.05, 174; 358/1.11, 538, 462
See application file for complete search history.

(56) References Cited

U.S. PATENT DOCUMENTS

| 5,673,059 A * | 9/1997 | Zavracky | G02B 27/017 345/8 |
| 6,349,001 B1 * | 2/2002 | Spitzer | G02B 27/017 345/8 |

(Continued)

FOREIGN PATENT DOCUMENTS

| EP | 2371339 A1 | 10/2011 |
| WO | 2007082534 A1 | 7/2007 |
| WO | 2008065520 A2 | 6/2008 |

OTHER PUBLICATIONS

Bonnington, C., "Take That, Google Glass: Apple Granted Patent for Head-Mounted Display," http://www.wired.com/2012/07/apple-patent-hud-display/ (last modified Jul. 3, 2012, 2:54 p.m.; last accessed Jan. 23, 2015 3:32 PM).

(Continued)

*Primary Examiner* — Yosef Kassa
(74) *Attorney, Agent, or Firm* — Nolan M. Lawrence

(57) ABSTRACT

A user is assisted in a real-world environment. An assistance engine receives at least one context from the user. The assistance engine also receives a video stream of the real-world environment. The assistance engine performs an optical character recognition process on the video stream based upon the at least one context. The assistance engine generates a response for the user. A microphone on a head-mounted device receives the context from the user. A camera on the head-mounted device captures the video stream of the real-world environment. A speaker on the head-mounted device communicates the response to the user. The user may move in the real-world environment based upon the response to improve the optical character recognition process.

20 Claims, 8 Drawing Sheets

(51) Int. Cl.
*H04N 5/232* (2006.01)
*G06F 3/16* (2006.01)
*G10L 13/08* (2013.01)

(56) References Cited

U.S. PATENT DOCUMENTS

| | | | | |
|---|---|---|---|---|
| 6,769,767 | B2* | 8/2004 | Swab | H04W 56/0015 |
| | | | | 351/158 |
| 7,321,783 | B2* | 1/2008 | Kim | B60R 25/102 |
| | | | | 348/E5.002 |
| 7,470,244 | B2* | 12/2008 | Harrison, Jr. | G04B 25/00 |
| | | | | 128/869 |
| 7,648,236 | B1* | 1/2010 | Dobson | G02C 11/10 |
| | | | | 345/8 |
| 7,900,068 | B2* | 3/2011 | Weststrate | G06F 1/26 |
| | | | | 713/300 |
| 7,903,878 | B2 | 3/2011 | Foss | |
| 7,912,289 | B2 | 3/2011 | Kansal et al. | |
| 7,991,607 | B2 | 8/2011 | Zhang et al. | |
| 8,208,729 | B2 | 6/2012 | Foss | |
| 8,467,133 | B2* | 6/2013 | Miller | G02B 27/017 |
| | | | | 353/28 |
| 8,488,246 | B2* | 7/2013 | Border | G02B 27/017 |
| | | | | 353/28 |
| 8,531,394 | B2* | 9/2013 | Maltz | G02B 7/287 |
| | | | | 345/156 |
| 8,594,387 | B2 | 11/2013 | Kobeli et al. | |
| 8,606,865 | B2* | 12/2013 | Layson, Jr. | G06Q 30/02 |
| | | | | 709/206 |
| 2001/0056342 | A1 | 12/2001 | Piehn et al. | |
| 2013/0044042 | A1 | 2/2013 | Olsson et al. | |
| 2014/0160250 | A1 | 6/2014 | Pomerantz et al. | |
| 2014/0278430 | A1 | 9/2014 | Wexler et al. | |

OTHER PUBLICATIONS

Fingas, "OpenGlass uses Google Class to identify objects for the visually impaired (video)," http://www.engadget.com/2013/08/02dapper-vision-openglass (created Aug. 2, 2013, 9:19 p.m., last accessed Nov. 18, 2014 2:02 PM).

Klaser, "Human Detection and Action Recognition in Video Sequences: Human Character Recognition in TV-Style Movies," Dec. 6, 2006, Master Thesis Defense A. Klaser.

Panchanathan et al., "iCare—A User Centric Approach to the Development of Assistive Devices for the Blind and Visually Impaired," Proceedings of the 15th IEEE International Conference on Tools with Artificial Intelligence (ICTAI'03), 1082-3409/03 © 2003 IEEE.

Pun et al., "Image and Video Processing for Visually Handicapped People," Hindawi Publishing Corporation EURASIP Journal on Image and Video Processing, vol. 2007, Article ID 25214, 12 pages, doi:10.1155/2007/25214.

NationsBlind, "Announcing the KNFB Reader iPhone App," You Tube, http://www.youtube.com/watch?v=cS-i9rn9nao, published Aug. 12, 2014.

\* cited by examiner

INTERACTIVE TEXT RECOGNITION BY A HEAD-MOUNTED DEVICE

BACKGROUND

The present disclosure relates to identifying text in a real-world environment, and more specifically, to a head-mounted device coupled to an assistive engine to provide a user with environmental information that is derived from text depictions.

Head-mounted devices operate by connecting to a processing engine to perform various tasks for a user wearing the device. They may provide visual depictions and are used in virtual reality scenarios to provide users with experiences separate from their environments. Head-mounted devices may also provide users with augmented reality scenarios (e.g., playing music in a user's ears, visually displaying email or map directions into a part of a user's field of vision).

SUMMARY

Embodiments of the disclosure may include a system for assisting a user in a real-world environment. An assistance engine is configured to receive at least one context from a network transceiver of a head-mounted device. A video stream comprised of a set of images is also received by the assistance engine from the network transceiver. The assistance engine performs an optical character recognition process on the video stream based upon the at least one context. The assistance engine transmits user information, in response to the optical character recognition process, to the network transceiver. A microphone of the head-mounted device receives the at least one context from the user. A camera of the head-mounted device captures the video stream from the real-world environment. A speaker of the head-mounted device communicates the user information to the user. The network transceiver is configured to transmit the video stream and the at least one context to the assistance engine. It is also configured to receive the user information form the assistance engine.

Embodiments of the disclosure may also include a computer program product that instructs a computer to perform a method for assisting a user in an environment. A video stream that includes a first set of images is captured by a head-mounted device. A verbal context from the user is received by the head-mounted device. An assistance engine performs an optical character recognition process to generate a textual status based on the verbal context and the video stream. An auditory response is generated by the assistance engine based upon the textual status. The auditory response is played to the user by the head-mounted device.

Embodiments of the disclosure may also include a method for assisting a user in an environment. A first set of images is captured by a head-mounted device. A first optical character recognition process is performed on the first set of images by an assistance engine to generate a first content evaluation. The first content evaluation is related to a segment of text in the environment. The assistance engine generates an auditory command based on the first content evaluation. The head-mounted device plays the auditory command to the user. After the user moves in response to the auditory command, a second set of images is captured by the head-mounted device. The assistance engine performs a second optical character recognition process on the second set of images to generate a second content evaluation related to the segment of text. The assistance engine generates an auditory response based upon the second content evaluation. The auditory response is played to the user by the head-mounted device.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
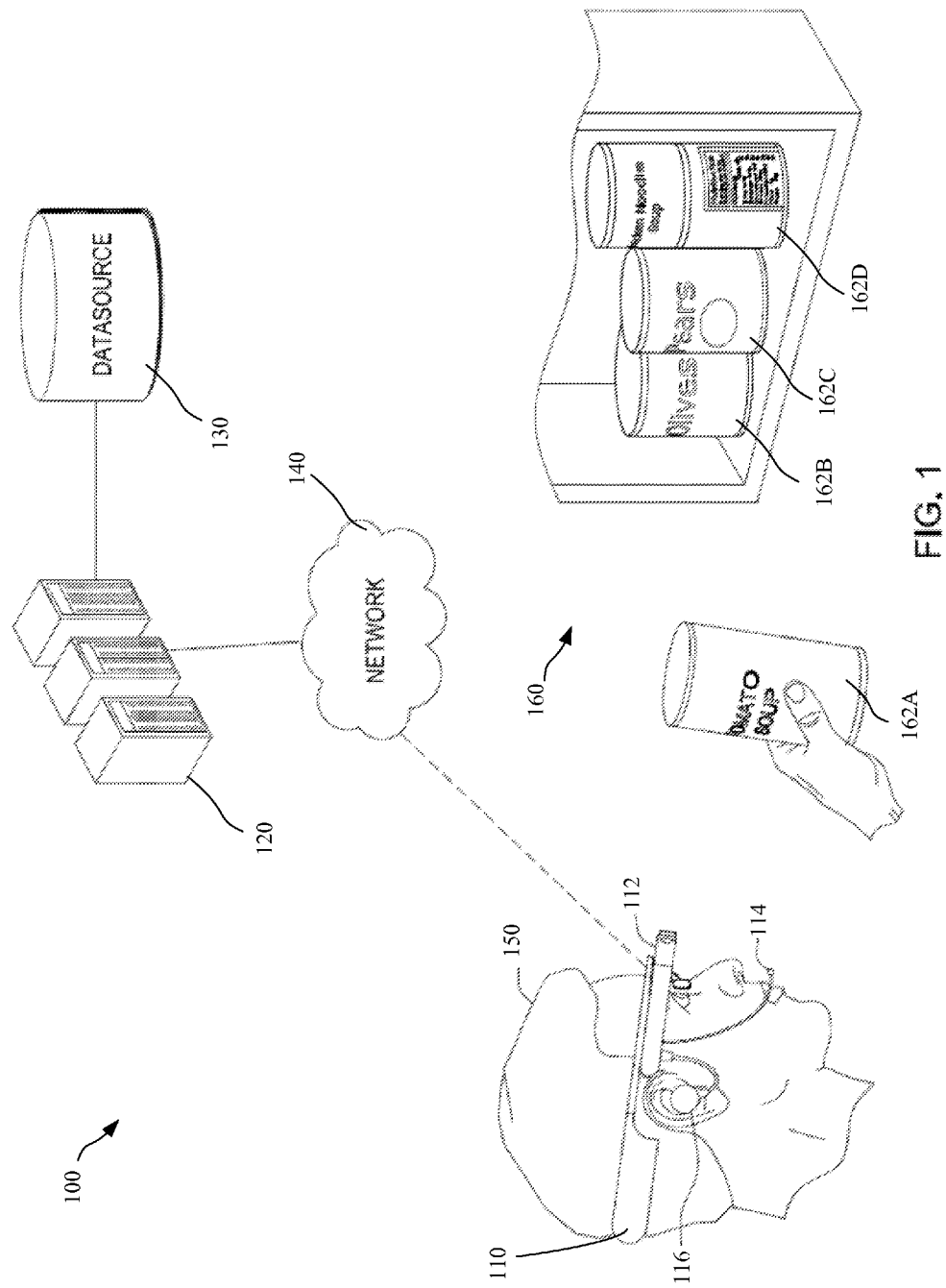
FIG. 1 depicts an example assistance system to provide a user with text found in an environment consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying text in a real-world environment, more particular aspects relate to a head-mounted device coupled to an assistive engine to provide a user with environmental information that is derived from text depictions. While the present disclosure is not necessarily limited to such applications, various aspects of the disclosure may be appreciated through a discussion of various examples using this context.

In a real-world environment, text describes virtually everything about the environment and the objects within the environment. Text is provided to text-reading users in a visual manner, such as by signs, labels, and other depictions of words and symbols. Visually-impaired users, however, are not able to recognize some or all of these depictions of words and symbols. Visually-impaired users may, in some cases, otherwise be able to navigate an environment, such as seeing lights and obstacles but may be unable to read text.

Other users may have the ability to see text but not the ability to understand the words and symbols within the text, such as a user suffering from Dyslexia or illiteracy.

Traditionally, visually-impaired users are able to navigate a real-world environment because it has been altered (e.g., adding braille to signs, installing loud-speakers that communicate information by sound to an area, etc.). These methods rely upon altering the environment to aid a visually impaired user in navigating the environment and may include added costs. In some cases, the environmental alterations place a burden onto both text-reading users and visually-impaired users. For example, in one scenario a first individual is getting ready to cross an intersection and another individual nearby is trying to talk on a cellular phone. A loud-speaker is installed at the intersection and broadcasts that it is okay to cross the intersection. This is helpful to the individual that is getting ready to cross but makes it hard for the other individual to continue talking on the cellular phone. Additionally, visually-impaired users may also rely on other people to help them navigate their environment, which may be unnecessarily costly.

Existing handheld technology may aid visually-impaired users in navigating an environments. Magnifying and telescopic devices, for example, allow a visually-impaired user to identify text that is up close or farther away from the visually-impaired user, respectively. Unfortunately, those devices do not assist all visually-impaired users, such as those suffering from Dyslexia. Other devices, such as braille readers may translate visual text into braille symbols. But in all cases, these devices require the user to carry an additional device everywhere they travel. Finally, smartphones may perform an optical character recognition (OCR) process on environmental text and provide text to a user. Even smartphones, however, require the user to have a free hand anytime they need to understand text, and provide no way for the user to direct or personalize the OCR process with feedback.

In some situations, head-mounted devices may allow for a user to navigate an environment by receiving information from a computer system while freeing a user's hands to interact with and move about the environment. These systems may be an extension of a smart phone that projects visual information, such as text messages and navigation directions, into the viewpoint of a user. Unfortunately, these systems may not provide assistance to a user with visual-impairments because they rely on the user to center text within their view using the user's vision. Moreover, the user may need to ensure the picture is in focus, aligned, and unobscured. Finally, in some situations, OCR processes may provide users with no context when faced with multiple instances of text, as would be experienced in a real world environment. For example, at a pharmacy text includes descriptions for products, aisles, any wet or freshly washed floors, entrances to bathrooms, and divisions or sections of the pharmacy. Providing information regarding all of this visual text would overload a user making it difficult to navigate the store.

An assistance system may provide a visually-impaired user with intuitive text recognition in a real-world environment. The assistance system may provide a user with the content (or information) about the user's real-world surroundings (e.g., text, words, and symbols). The assistance system may comprise an assistance engine and a head-mounted device. In some embodiments, the assistance system may comprise additional input sources, such as wireless location sensors or secondary cameras. For example, the assistance system may have a wireless location sensor, such as a Bluetooth low energy sensor or a global positioning system antenna. The wireless location sensor may provide location-information, improving the assistance engine in providing content to the user. In another example, the assistance system may include a smartphone running a mobile operating system and including a digital camera. The digital camera of the smartphone may provide images from additional perspectives, improving the assistance engine in providing content to the user.

The assistance engine may comprise a dictionary, a content synthesis process, an optical character recognition (herein, OCR) process, and a response process. The content synthesis process, OCR process, and response process may be performed by one or more computer systems. The content synthesis process, OCR process, and response process may be performed by a smartphone. In some embodiments, the context synthesis process, OCR process, and response process may be performed by the head-mounted device. The assistance engine may perform the content synthesis process, the OCR process, and the response process repeatedly in response to input from the user. In some embodiments, the assistance engine may perform the content synthesis process, the OCR process, and the response process repeatedly based upon the results of a previous iteration of the OCR process.

The dictionary of the assistance engine may include alpha-numeric characters such as letters and numbers. The dictionary may also include groups of characters, such as words or sets of numbers. The dictionary may also include other characters or commonly used symbols, strokes, or features. In some embodiments, the dictionary may include information about how characters are related (e.g., the length and grouping of characters in a social security number, the association of the word calories and a numerical value on a nutrition label). The dictionary may be organized by a series of tags, or labels, such that certain words and characters are grouped together by one or more tags. For example, the word "toothpaste" may be associated with the tags "bathroom", "restroom", and "brushing teeth." The dictionary may be context, domain, or subject specific, containing words and phrases specific to a context. For example, a medication dictionary may contain only medication related words, phrases, labels, ingredients, etc.

The content synthesis process of the assistance engine may receive a context value. The context value may be in the form of spoken words from the user. The context value may refer to the location of the user in a real-world environment (e.g., the user's garage, a bathroom, a neighborhood electronic store). The context value may refer to the type of activity the user wants to perform (e.g., stain a piece of furniture, take headache medicine, or purchase memory for a computer). The context value may refer to the shape of an object that has relevant text on it (e.g., a can or a box). In some embodiments, the context value may refer to textual information that the user knows to be true—correcting the assistance engine based upon knowledge obtained by the user despite the user's inability to understand text. For example, the user may be looking at a parenting book and the assistance system recognizes a word as "monkey." The user may provide a context value by stating that the word is "mommy."

The OCR process of the assistance engine may receive a video stream that includes an image or frame of the environment of the user. The video stream may include multiple images or frames of the environment of the user. In some embodiments, the video stream may include one or more images or frames of objects within the environment of the user. In embodiments, the video stream may be comprised of a set of images (i.e., one or more images or frames).

The OCR process may recognize text in a video stream using known techniques, (e.g., the OCR process may perform a comparison between the images or frames of the video stream and the dictionary to identify characters or symbols). The OCR process may do further enhancements, for example, the OCR process may perform the comparison against a subset of the dictionary. The subset of the dictionary may be created by using information from the context value. The subset of the dictionary may be created by utilizing location sensors from the head-mounted device or another device (e.g., a smartphone, one or more wireless beacons). The OCR process may perform the text recognition by first referring to the context or domain specific dictionary, then a more generic dictionary in this order, to get a more accurate result.

In some embodiments, the subset of the dictionary may be created by using information acquired from previous uses of the assistance system. For example, the assistance system may have previously visited a restaurant while using the assistance system. The assistance system may have provided the user with the name of a restaurant, the names of dishes served by the restaurant, and the prices of the dishes. The assistance system may have provided the user with incorrect information regarding the names of the dishes. The user may have corrected the assistance system by providing the correct names of the dishes. The assistance engine may update the dictionary, by adding fields that contain the correct names of the dishes from the user, and associating those names of the dishes with the restaurant name. Later, when the user again visits the restaurant, the OCR process may utilize the additional corrections to more accurately perform the comparison to the dictionary. In some embodiments, another user may use the information acquired from previous uses of the assistance system by other users of the assistance system.

The OCR process may generate a textual status based upon the video stream, (e.g., an evaluation of the characters and symbols to determine the successfulness of the comparison to the dictionary). The textual status may be the words or phrases recognized in the video stream (e.g., the textual status is "tomato soup", the textual status is "sodium 120 mg"). The textual status may also include a likelihood, or confidence, that the word or phrases were correctly recognized (e.g., the textual status is "55% likelihood word='calories'", the textual status is "very confident the medicine is an antihistamine"). In some embodiments, the textual status may include the characters or symbols recognized in the video stream and the likelihood that the characters or symbols were recognized. For example, in one scenario the object the user is trying to identify is an antihistamine bottle with an active ingredient of Loratadine. The textual status may be "85% likelihood of characters 'lo', 57% likelihood of characters 'rata', 27% likelihood of characters 'di'."

The OCR process may determine the likelihood or confidence based on certainty to choose a proper word, phrase or sentence, when an image contains "broken", blurred, or even missing words by using a weighted approach. For example, the word in the environment is "break" and the video stream depicts "take a brea." The OCR process may select from between three possibilities each having a 33% likelihood: "bread", "break", and "breadth." The OCR process may apply a medication context to determine both "break" and "breadth" are 90% likely to be the word in the environment. The OCR process may generate a textual status that contains two possibilities (e.g., the textual status is "(90% likelihood medication recommends either 'take a break' or 'take a breadth'").

The response process may generate an auditory response (e.g., a sound file) from the textual status for playback by the head-mounted device. The response process may decide that the auditory response should be words, phrases, characters or symbols recognized by the OCR process (e.g., tomato soup, tooth paste, allow varnish to sit for 4 to 6 hours). The response process may decide that the auditory response should include the likelihood that the text was determined by the OCR process (e.g., "75 percent confident wood stain", "very confident smartphone costs 299 dollars"). The response process may decide that the auditory response should be an instruction to improve the video stream (e.g., "turn your head to the left an inch", "raise the box two inches", "rotate the can a little"). In some embodiments, the response process may decide that the auditory response should include the recognized text, the likelihood of recognized text, and instructions to improve the video stream (e.g., "57 percent confident the soup has 120 milligrams of sodium, rotate the can a little to improve confidence rating"). In some embodiments, the response process may decide that the auditory response should include context from of an earlier OCR process (e.g., "confirmed, now 89 percent confident the soup has 120 milligrams of sodium", "update, 85 percent confident the soup actually has 110 milligrams of sodium").

The head-mounted device (alternatively, headset) may comprise a network transceiver, a camera, a microphone, and an audio playback mechanism. The network transceiver may communicate directly to the assistance engine, such as by way of a cellular or wireless network. The network transceiver may communicate indirectly to the assistance engine, such as through a computer or a smartphone. The network transceiver may transmit the context values to the assistance engine. The network transceiver may transmit the video stream to the assistance engine. The network transceiver may receive the auditory response from the assistance engine. The assistant engine may be built into the head-mounted device. In this case, the network transceiver may be not necessary.

The camera of the head-mounted device may capture the video stream as a single image or frame. The camera may capture the video stream as a series of images or frames. In some embodiments, the camera may merge together multiple images or frames of the video stream into a singular image. The microphone may receive the context values as voice inputs from the user. The microphone may receive the context values as background noise from the environment. The audio playback mechanism of the head-mounted device may be a speaker directed towards one ear of the user. The audio playback mechanism may be a first speaker directed towards one ear of the user, and a second speaker directed towards the other ear of the user. The audio playback mechanism may play the auditory response from the assistance engine.

FIG. 1 depicts an example system 100 consistent with embodiments of the present disclosure. The system 100 may comprise a headset 110, one or more computing devices 120, and a datasource 130. The various components of the system 100 may be communicatively coupled by way of a network 140. The system 100 may assist a user 150 to navigate a real-world environment 160. The real-world environment 160 may contain one or more objects 162A, 162B, 162C, 162D (collectively, 162).

The headset 110 may comprise the following: a camera 112 for capturing a video stream; a microphone 114 for capturing one or more context values; an earphone 116 for playing back one or more auditory responses; and a wireless transceiver (not depicted) for communicating with the rest of the system 100. The computing devices 120 may be any computer capable of performing an assistance engine and generating the auditory response, such as a smartphone or one or more servers. The computing devices 120 may receive the video stream and the context values from the headset 110. The assistance engine may access one or more dictionaries (not depicted) stored on the datasource 130 to perform an OCR process.

For example, the user 150 may speak a context value of "I want to eat fruit." The microphone 114 may capture the context value. The camera 112 may capture a video stream of the user holding the object 162A and standing in front of all the objects 162. The headset 110 may transmit the context value and the video stream to the computing devices 120 through the network 140. The computing devices 120 may perform the OCR process by comparing the strokes, features, characters, or text from the frames of the video stream to the dictionary on the datasource 130; various techniques may be used for the character recognition during the process. The OCR process may use the context value "I want to eat fruit" to more quickly search the dictionary and also to determine that the object 162A is a can containing soup. The assistance engine may determine that there are other objects 162 behind the object 162A the user is holding but that object 162 is partially obstructing the video stream. The assistance engine may generate an auditory response of "lower the can a few inches" so that the video stream may capture the objects 162 without object 162A. The headset may play through the earphone 116 the auditory response prompting the user to lower the can. The headset 110 continues to capture and transmit the video stream to the computing devices 120 and may capture the objects 162 clearly. The assistance engine may determine that there are three cans based on the curvature of the cans in the video stream capture by the camera 112. The OCR process may determine that the word "pear" on the object 162C matches the dictionary with the context value "I want to eat fruit." The assistance engine may determine that object 162C is relevant to the user. The assistance engine may generate an auditory response of "behind the object in your hand is a can of pears in the middle of two other cans."

Figure 2A:
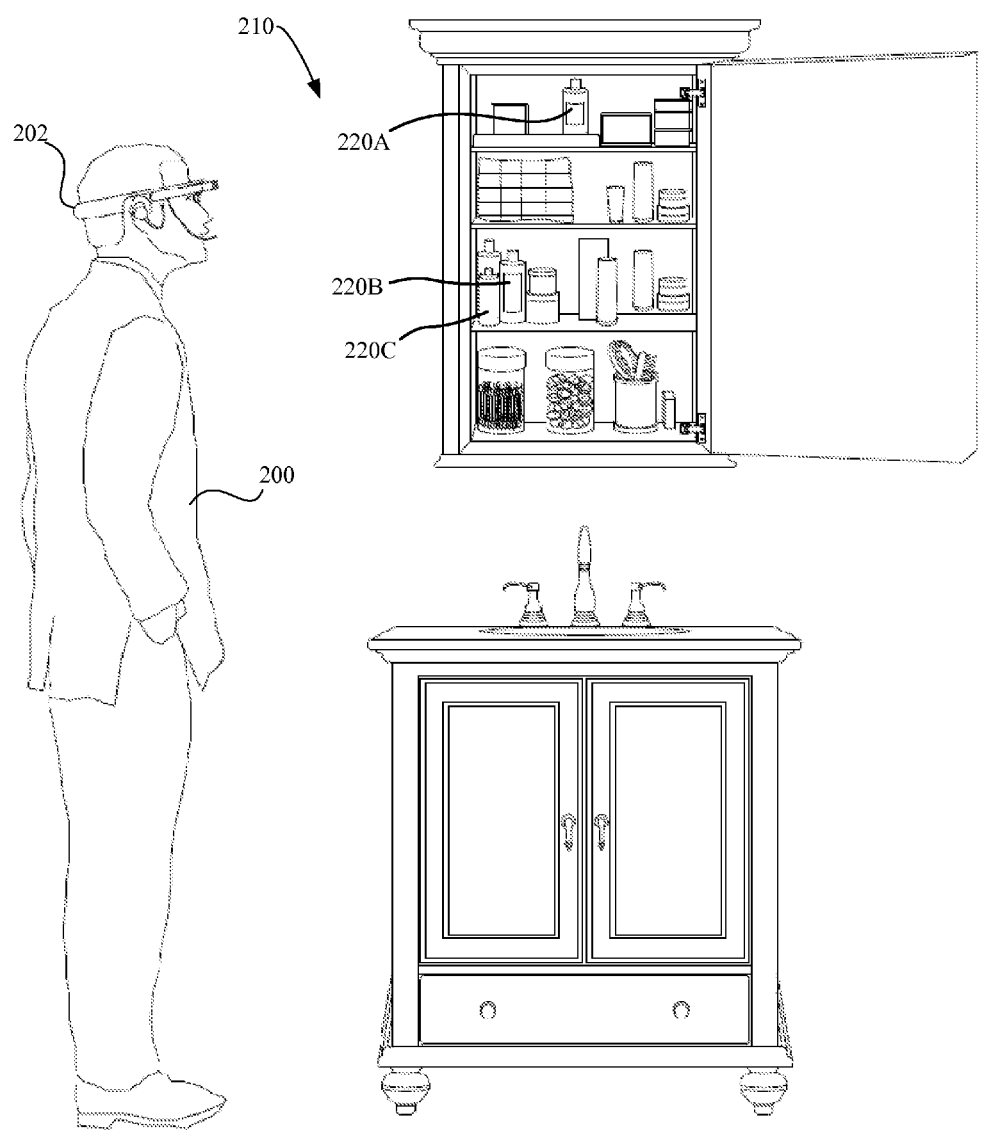
FIG. 2A depicts an example real-world bathroom environment with a user providing context to an assistance system consistent with embodiments of the present disclosure.

FIG. 2A depicts an example of a user 200 in a real-world environment 210 (herein, environment), the user providing context to a system consistent with embodiments of the present disclosure. The system may include a headset 202 communicatively coupled to an assistance engine (not depicted). The headset 202 may transmit a video stream of the environment 210 and context from the user 200 to the assistance engine. The assistance engine may provide to the headset 202 one or more auditory responses. The headset 202 may provide the auditory responses to the user 200. The auditory responses may describe text present in the environment 210.

The environment 210 may contain objects 220A, 220B, and 220C (collectively, 220) with text written on them. The context provided by the user 200 may pertain to the location of the environment 210, such as a restroom. The context provided by the user 200 may pertain to a task the user wants to perform in the environment 210, such as shaving or oral hygiene. The assistance engine may be able to identify the objects 220 in the environment 210. The context provided by the user 200 may enable the assistance engine to provide the headset 202 with more accurate responses. The context provided by the user 200 may enable the assistance engine to provide the headset 202 with more timely responses.

Figure 2B:
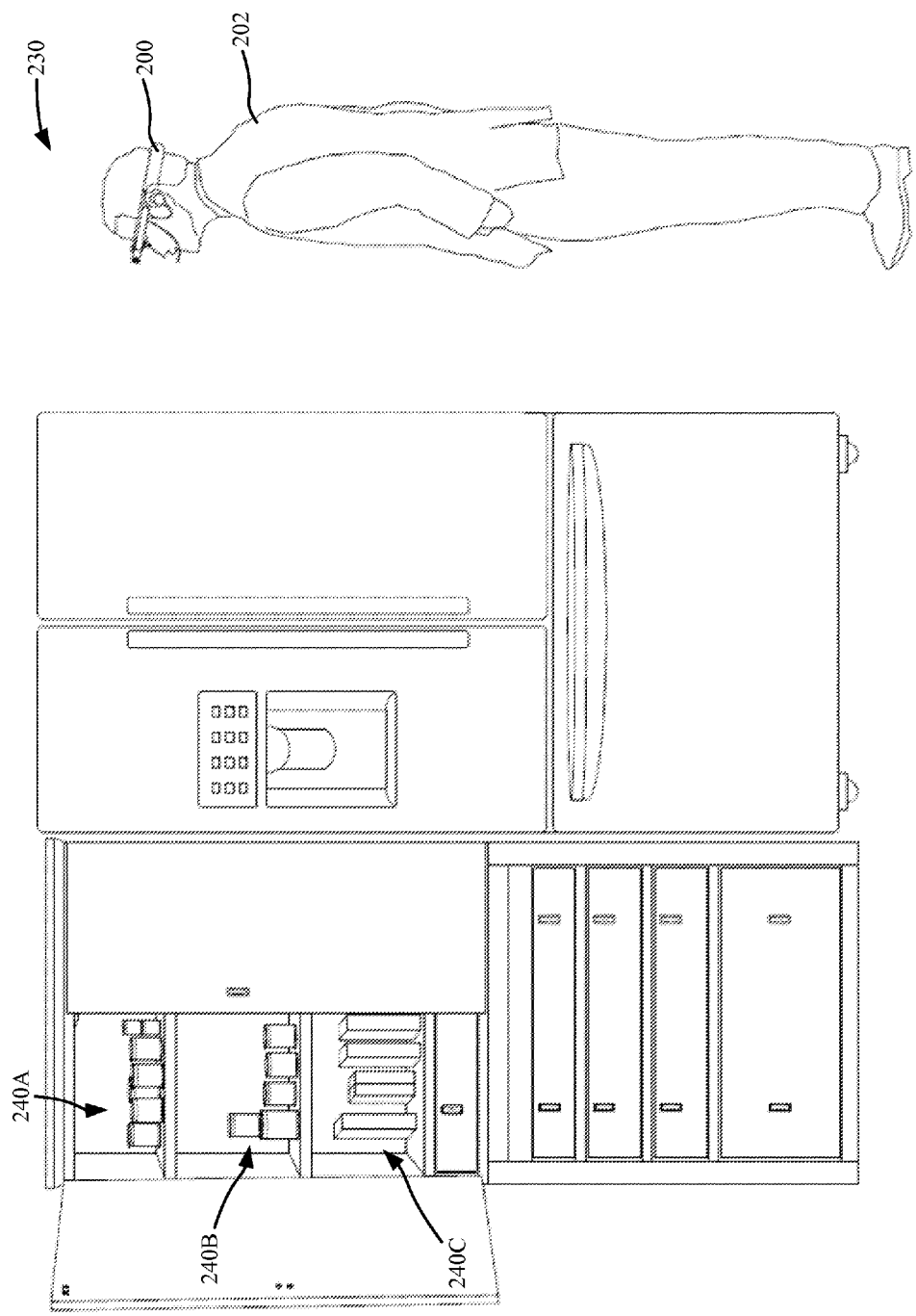
FIG. 2B depicts an example real-world kitchen environment with a user providing context to an assistance system consistent with embodiments of the present disclosure.

FIG. 2B depicts an example of the user 200 in an environment 230, the user providing context to a system consistent with embodiments of the present disclosure. The user 200 may wear the headset 202 to provide the user with text within the environment 230. The headset 202 may wirelessly communicate with the assistance engine (not depicted), such as through a Wi-Fi or cellular network. The headset 202 may receive a video stream of the environment 230 and context from the user 200. The context may be provided to the headset 202 verbally, such as by words, phrases, or commands from the user 200. The headset 202 may provide the assistance engine with the context and the video stream, and the assistance engine may provide the headset with an auditory response based upon the context and the video stream. The assistance engine may provide the headset 202 with an auditory response based upon other factors, such as previous auditory responses, location based information from one or more wireless location beacons, or one or more gyroscopic sensors built into the headset. The environment 230 may contain objects 240A, 240B, and 240C (collectively, 240) with text on them. The user 200 may receive information about the objects 240 from the auditory response played by the headset 202, such as the brand name, the ingredients, or the nutrition information.

Figure 3:
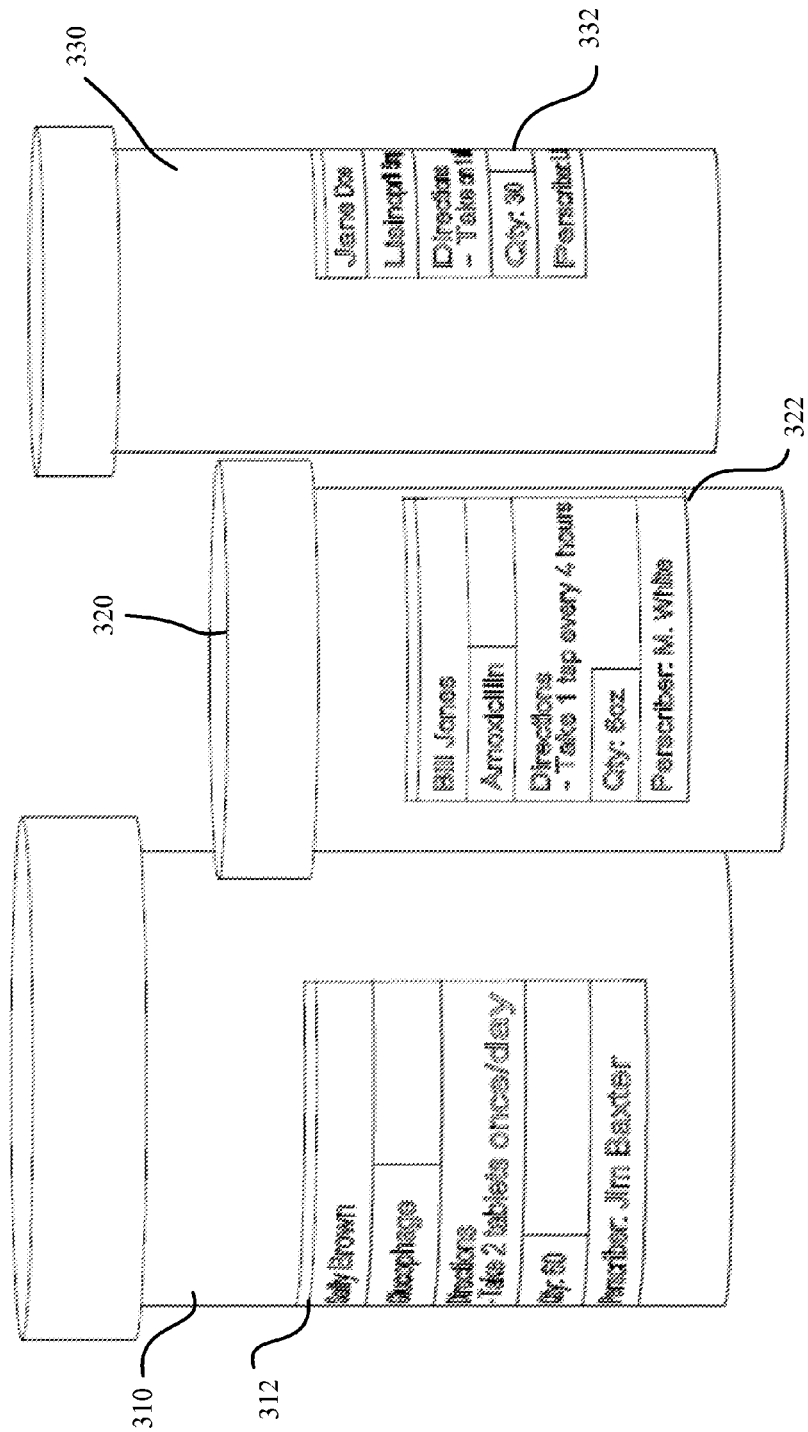
FIG. 3 depicts example real-world environmental objects identifiable by an assistance system consistent with embodiments of the present disclosure.

FIG. 3 depicts example real-world environmental objects identifiable by a system consistent with embodiments of the present disclosure. In particular, FIG. 3 depicts a first container 310, a second container 320, and a third container 330. The first container 310 has a label 312 that may provide information about the contents of the first container. The second container 320 has a label 322 that may provide information about the contents of the second container. The third container 330 has a label 332 that may provide the information about the contents of the third container. The user may utilize the system by providing the system with context verbally, such as by the user stating his own name, or by asking for a specific type of object. The system may provide feedback and responses to the user, such as suggesting that the user move in a certain direction or rotate objects found by the user, or may provide the actual text written on the objects. A user (not depicted) utilizing the system (not-depicted) may interactively identify information regarding the objects, including the first container 310, the second container 320, and the third container 330.

For example, the user may suffer from a visual impairment preventing them from reading, such as cataracts. The user may reside in a retirement community sharing storage of his personal belongings with other individuals, including the first container 310, the second container 320, and the third container 330. The first container 310, second container 320, and third container 330 may contain medication for the residents of the retirement community. The user may be able to see the first container 310, the second container 320, and the third container 330, but may not be able to read information printed on the containers. The user may ask the system for the user's medication. In response to the user, the system may identify the second container 320 based upon a video stream comprising images of the containers and examining the information on the first label 312, the second label 322, and the third label 332. The system may make the identification also based on the context of the request by the user. The system may make the identification also based upon previously given information from the user, (e.g., the user told the system his name, the user told the system the type of medication he requires).

In a second example that utilizes the facts above, the user may help another resident of the retirement community. The other resident may be named "Sally Brown" and may suffer from a condition that causes her to have variable blood sugar levels if she does not take her medication. The user may know the name of the other resident but not any of her underlying conditions. The user may find the other resident is dizzy and having trouble focusing. The user may ask the other resident if she is taking any medication and if she responds yes, he may use the system to identify her medication. The user may provide the information he knows about the other resident to the system by speaking "find the medication for Sally Brown." The system may obtain a video stream capturing the first container 310, the second container 320, and the third container 330. The system may identify the text in the first label 312 based upon the video stream and upon the information received by the user. The system may provide an auditory response to the user stating "50 percent certain the left container is the medication for Sally Brown—please rotate the left container." The system may continue retrieving images from the video stream of the first container 310 from the video stream and the user may include additional context to the task by speaking "what is the dosage." The system may utilize the newly provided context from the user and the video stream from the initial viewing of the first container 320, and the later retrieved images to provide an additional response to the user stating "now 80 percent certain the left container is the medication for Sally Brown—the dosage is 2 tablets once per day."

Figure 4:
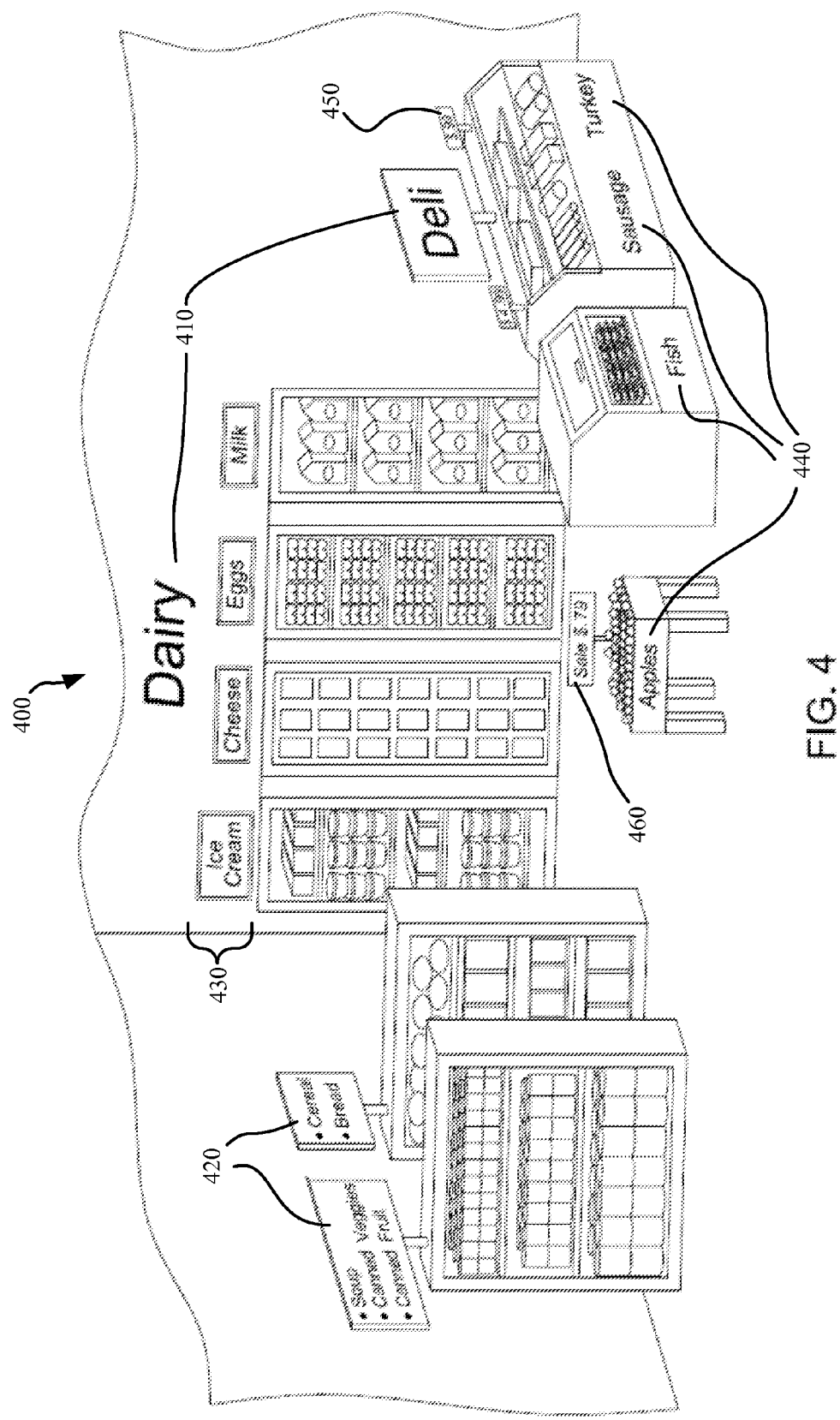
FIG. 4 depicts an example real-world environment with objects identifiable by a system consistent with embodiments of the present disclosure.

FIG. 4 depicts an example real-world environment with objects identifiable by a system consistent with embodiments of the present disclosure. In detail FIG. 4 depicts a grocery store environment 400 (herein, store) containing groceries that may be purchased by a user (not depicted) suffering from a visual impairment that prevents the reading of text on objects. The user may utilize a headset-coupled assistance system (not depicted) to interactively navigate the store 400 and purchase groceries.

For example, the store 400 contains section signs 410, aisle signs 420, category signs 430, product signs 440, price signs 450, and sale signs 460. The user may be able to view the shapes of objects and the depth of obstacles in the environment but not the text due to a visual impairment. The user may first shop for bread by speaking "locate the eggs" to the system. The system may capture a video stream of the store 400 and may also capture the user speaking. The system may respond to the user by playing a computer-generated speech that states "look slightly upward, and then slowly look from left to right." As the user follows the computer-generated speech from the system the system may continue capturing a video stream of the store 400. The system may capture in the video stream sale signs 460 and determine that apples are on sale.

The system may use the video stream to determine the location of the eggs in the store 400, based on the section signs 410 and the category signs 430 captured in the video stream. In some embodiments, the system may determine the location of the eggs in the store 400, from the section signs 410 captured in the video stream and additionally from general knowledge of the layout of grocery stores already in the system. The system may inform the user by playing a computer-generated speech that states "go to dairy section of the store" and because the user can see the environment, the user may proceed to the section of the store 400 where the dairy is located. As the user heads towards the dairy, the system may continue to determine objects in the environment 400 based on capturing the video stream. When the user nears the dairy, the system may determine from the category signs 430 that eggs are located in a specific freezer and may direct the user to the specific freezer.

The user may ask the system a question by speaking "Are any items on sale?" The system may match the terms spoken by the user to text captured in the video stream and may identify apples as matching the question asked by the user. The system may respond with a computer-generated speech that states "apples are on sale for seventy nine cents." The user may then ask for the location of another object in the store 400 by speaking "I want canned soup." The system may continue to analyze the video stream and identify the section signs 410, aisle signs 420, category signs 430, product signs 440, price signs 450, and sale signs 460 in the store. The system may also continue to provide the user with information regarding the objects in the store 400 based upon the video stream and the context provided by the user, thus navigating the user to through the store.

Figure 5:
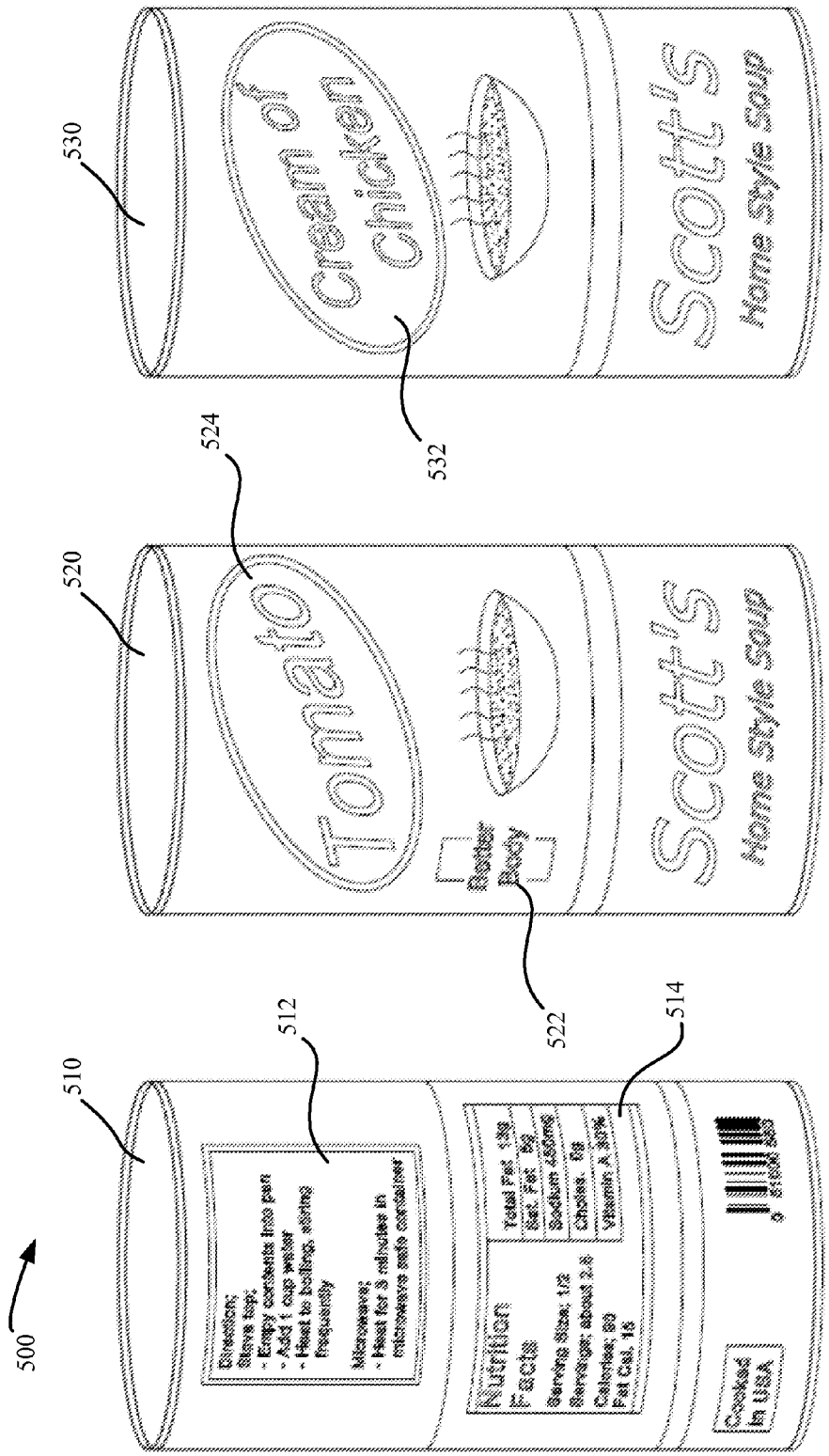
FIG. 5 depicts example real-world environmental objects located within the real-world environment of FIG. 4 and identifiable by a system consistent with embodiments of the present disclosure.

FIG. 5 depicts example real-world environmental objects identifiable by a system consistent with embodiments of the present disclosure. In particular, FIG. 5 depicts a soup aisle 500 in the store 400 of FIG. 4. A user (not depicted) may utilize a headset-coupled assistance system (not depicted) to interactively purchase groceries in the soup aisle 500 of the store 400. The system may capture a video stream of the soup aisle 500 and may capture verbal communications from the user. The system may provide responses to the user in the form of computer-generated speech. The video stream may capture images of a first soup 510, a second soup 520, and a third soup 530. The user may request more information from the system by speaking "I want chicken soup." The system may determine from the speaking of the user and from the video stream that the third soup 530 contains chicken. But, the system may not be able to determine any other details of the third soup 530 because the images capture by the video stream are out of focus. The system may prompt the user to get additional images that are in focus by giving the command "50 percent certain one can of soup in front of you contains chicken—get closer to the cans of soup." As the user moves closer, the system continues capturing the video stream and determine that the third soup 530 contains cream of chicken soup based upon the label 532. The system provides the user with the information "now 87 percent certain the can of soup in front of you and to the right contains cream of chicken soup."

The user may decide he needs to eat better and asks the system for help by speaking "I want healthy soup." The system may identify the first soup 510 has a cooking directions label 512 and a nutrition label 514 visible from the video stream. The system may also identify the second soup 520 has a health-related label 522. The system may determine based upon the context provided by the user that the nutrition label 514 and the health-related label 522 are relevant to the user. The system may provide a response by stating "the soup on the left has 450 milligrams of sodium, and the soup in the center states that it is 'better body' soup." The user may request what kind of soup the second soup 520 is by speaking "what kind of soup is in the middle." The system may read the text on the label 524 of the second soup 520 to determine the type of soup. The system may respond to the user by stating "tomato soup."

Figure 6:
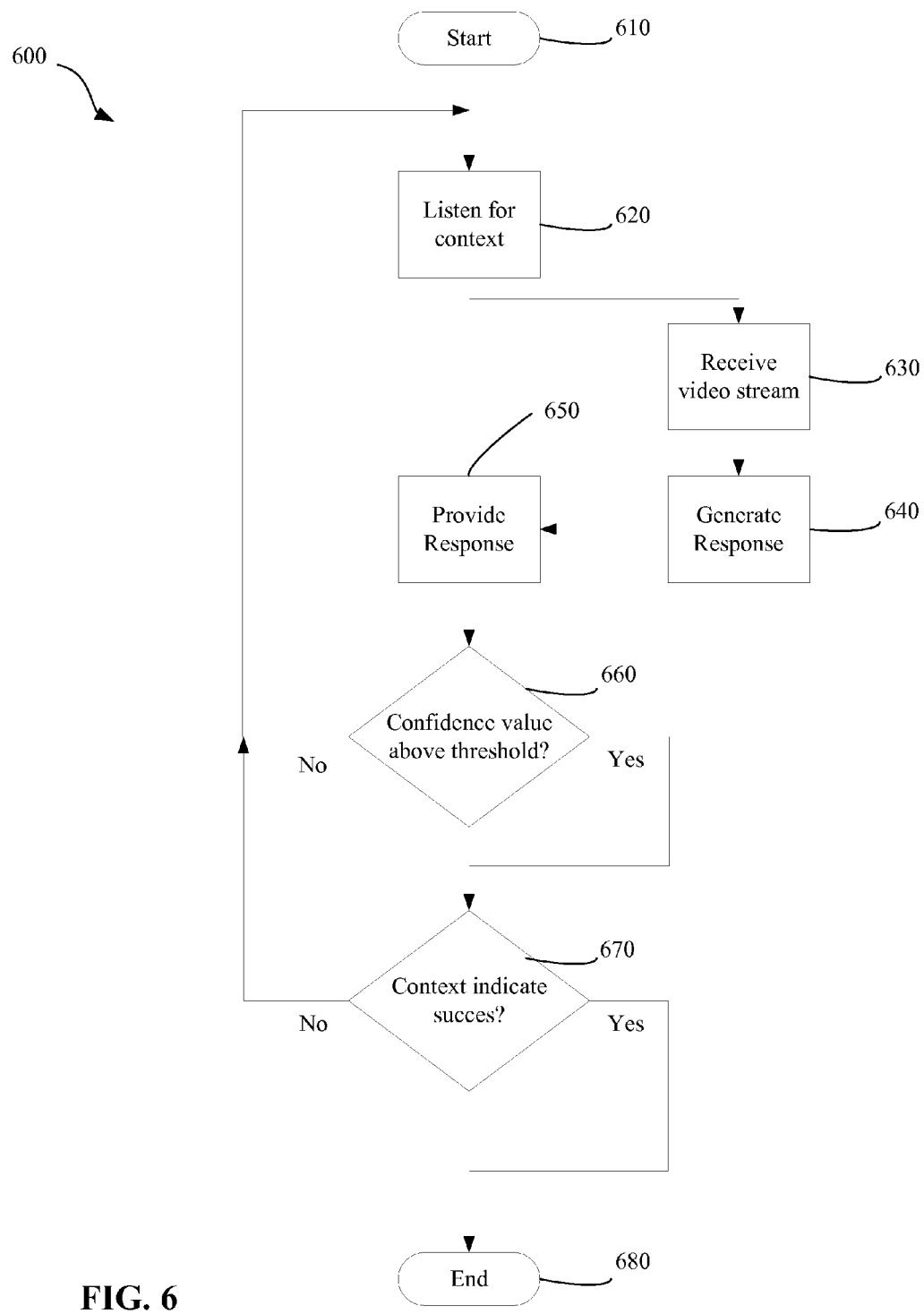
FIG. 6 depicts an example method for providing a user with responses regarding information in an environment from a system consistent with embodiments of the present disclosure.

FIG. 6 depicts an example method 600 consistent with embodiments of the present disclosure. The method 600 may be running by a computer system communicatively coupled to a head-mounted device. A user may wear the head-mounted device to navigate an environment. The head-mounted device can receive feedback in the form of a video stream of the environment and one or more contextual values (herein, context) from the user.

At start 610, the method 600 may begin to listen for context 620 from the user. The user may provide instructions or clarifications regarding the environment. At 630, the method 600 may begin receiving the video stream from the head-mounted device. At 640, a response may be generated based upon the video stream. In some embodiments, the response may include a content evaluation. The content evaluation may include certain techniques known to those skilled in the art, such as object recognition, edge detection, and color analysis. The content evaluation may include other known techniques such as the user of a natural language processor that performs an analysis of text in the video stream. In some embodiments, the analysis may include syntactic analysis, semantic analysis, and converting sequences of characters. The converting sequences of characters may operate based on identification and association of text elements such as words, numbers, letters, symbols, and punctuation marks. In some embodiments, the content evaluation may include analysis of the video stream without performing an entire OCR process, (e.g., by determining the images of the video stream are too bright or dark, that the images lack sufficient contrast, or that the clarity of the images render the text elements undiscernible).

In some embodiments, the response may generate the response based upon the video stream and the context. During generation of the response, at 640, the system may also determine a confidence value indicative of how likely text was correctly identified. In some embodiments, the confidence value may be included within the response. At 650, the response may be provided to the head-mounted device, and the head-mounted device may provide the response to the user.

If the system determines that the confidence value is above a certain threshold, at 660, the system will wait for the user to indicate that the system was successful in providing text from the environment. For example, if the system determines that the confidence value is above 85% likelihood of correct identification of text in the environment the system will wait for approval from the user. If the system determines the confidence value is below a certain threshold, at 660, the system may continue to listen for context input at 620 and receive the video stream at 630. In some embodiments, if the system determines the confidence value is below a certain threshold, at 660, the system may ask for continued context input from the user. If the user provides context to the system that indicates the system was successful, at 670, the system will end at 680. The context that indicates the system was successful may include the user thanking the system, or the user indicating that the response makes sense. In some embodiments, the context that indicates the system was successful may be the absence of context from the user (e.g., silence). If the user provides context to the system that does not indicate the system was successful, at 670, the system may continue to listen for context at 620 and receive the video stream at 630.

Figure 7:
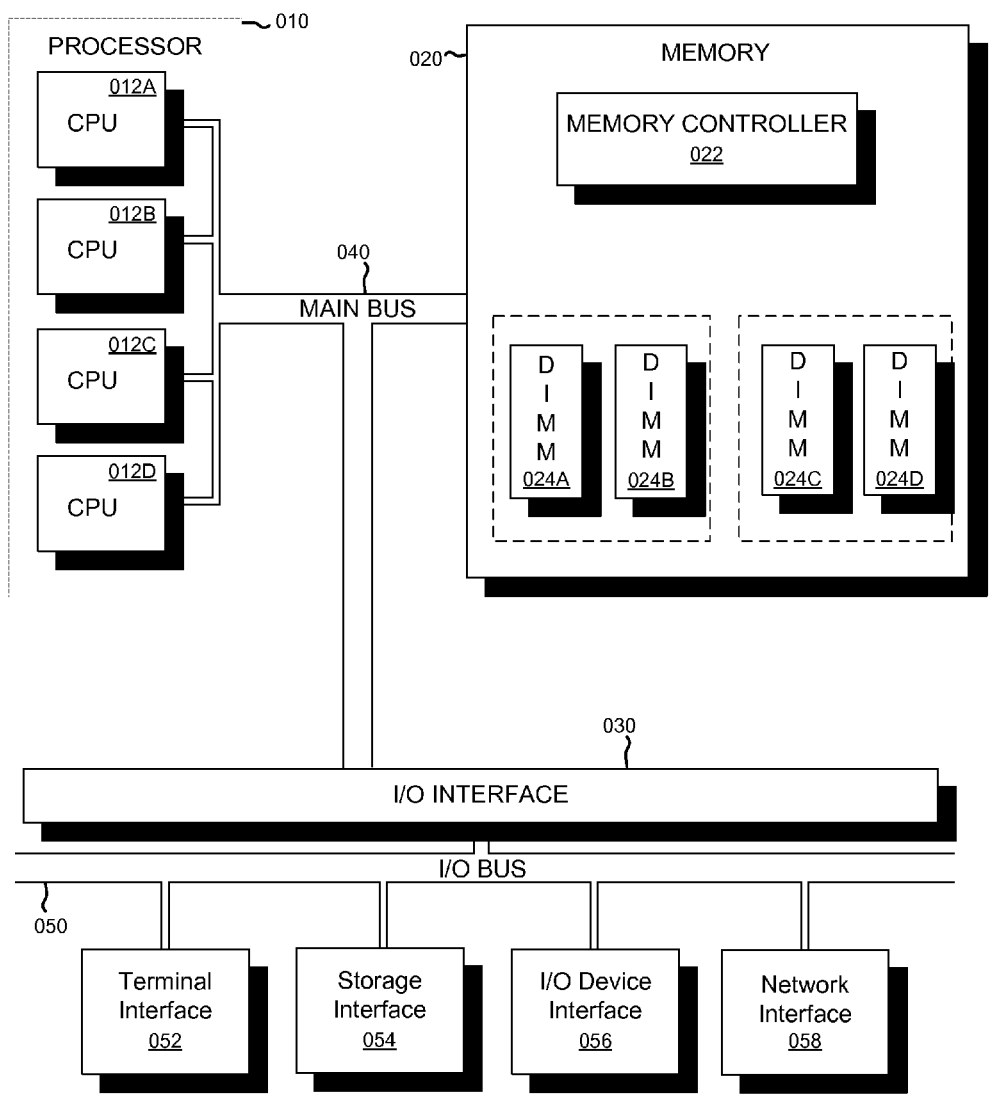
FIG. 7 depicts the representative major components of a computer system consistent with embodiments of the present disclosure.

FIG. 7 depicts the representative major components of an exemplary computer system 001 that may be used, in accordance with embodiments of the invention. It is appreciated that individual components may have greater complexity than represented in FIG. 7, components other than or in addition to those shown in FIG. 7 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted).

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for assisting a user in a real-world environment, the system comprising:
an assistance engine configured to:
receive, from a network transceiver of a head-mounted device, at least one context,
receive, from the network transceiver, a video stream that comprises a first set of images,
perform, based on the at least one context, an optical character recognition (OCR) process on the video stream, and
transmit, to the network transceiver, user information in response to performing the OCR process; and
the head-mounted device comprising:
a microphone configured to receive the at least one context from the user,
a camera configured to capture the video stream from the real-world environment,
a speaker configured to communicate the user information to the user, and
the network transceiver configured to transmit the video stream and the at least one context to the assistance engine, the network transceiver further configured to receive the user information from the assistance engine.

2. The system of claim 1, wherein the user information is configured to direct the user to move within the environment, and wherein the video stream further comprises a second set of images that the camera is configured to capture subsequent to a communication of the user information to the user.

3. The system of claim 1, wherein the user information comprises an instruction to manipulate an object in relation to the head-mounted device, and the video stream further comprises a second set of images that the camera is configured to capture subsequent to a communication of the instruction.

4. The system of claim 3, wherein the user information is selected from a group consisting of an instruction to raise the object, bring the object closer, move the object to the right, rotate the object clockwise, and spin the object.

5. The system of claim 1, wherein the context includes a location related to the environment.

6. The system of claim 1, wherein the context includes a task to be performed in the environment.

7. The system of claim 1, wherein the context includes information about an object in the environment.

8. The system of claim 7, wherein the context includes a category of information related to the object.

9. The system of claim 1, wherein the user information comprises an auditory reading of a portion of text in the environment.

10. The system of claim 1, wherein the user information comprises an auditory reading of a portion of text on an object in the environment.

11. A computer program product for assisting a user in an environment, the computer program product comprising a non-transitory computer readable storage medium having program instructions embodied therewith, the program instructions executable by a computer to perform a method comprising:
capturing, by a head-mounted device, a video stream that includes a first set of images;
receiving, by the head-mounted device, a verbal context from the user;
performing, by an assistance engine, an optical character recognition (OCR) process to generate a textual status based on the verbal context and the video stream;
generating, by the assistance engine, an auditory response based upon the textual status; and
playing, by the head-mounted device, the auditory response to the user.

12. The computer program product of claim 11, wherein the textual status is a recognized portion of text in the environment and the auditory response is the recognized portion of text in the environment.

13. The computer program product of claim 11, wherein the textual status is an unrecognized portion of text on an object in the environment and the auditory response is a movement command to the user to improve the performing the OCR process, the method further comprising:
capturing, by the head-mounted device, a second set of images subsequent to the playing of the auditory response,
generating, by the assistance engine, a second textual status based on the second set of images;
generating, by the assistance engine, a second auditory response based upon the second textual status; and
playing, by the head-mounted device, the second auditory response to the user.

14. The computer program product of claim 13, wherein the movement command is selected from the group consisting of move to the left in the environment, move the object to the left, look upward slightly, move the object away from the user, rotate the object clockwise, and spin the object.

15. A method of assisting a user in an environment, the method comprising:
capturing, by a head-mounted device, a first set of images;
performing, by an assistance engine, a first optical character recognition (OCR) process on the first set of images to generate a first content evaluation related to a segment of text in the environment;
generating, by the assistance engine, an auditory command based on the first content evaluation;
playing, by the head-mounted device, the auditory command to the user;
capturing, by the head-mounted device, a second set of images subsequent to movement of the user in response to the auditory command;
performing, by the assistance engine, a second OCR process on the second set of images to generate a second content evaluation related to the segment of text;
generating, by the assistance engine, a auditory response based on the second content evaluation; and
playing, by the head-mounted device, the auditory response to the user.

16. The method of claim 15, wherein the second content evaluation is that the segment text in the second set of images is recognized and wherein the auditory response comprises the segment of text in the environment.

17. The method of claim 15, wherein the second content evaluation is that the segment of text in the second set of images is not recognized, wherein the auditory response is a first auditory response, and wherein the first auditory response is a command to the user to move in relation to the environment, wherein the method further comprises:
- capturing, by the head-mounted device, a third set of images subsequent to movement of the user in response to the first auditory response;
- transmitting, by the head-mounted device, the third set of images to the assistance engine;
- performing, by the assistance engine, a third OCR process on the third set of images to generate a third content evaluation related to the segment of text;
- generating, by the assistance engine, a second auditory response based on the third content evaluation;
- receiving, by the head-mounted device, the second auditory response from the assistance engine; and
- playing, by the head-mounted device, the third auditory response to the user.

18. The method of claim 15, wherein the performing the first OCR process is based on a context provided by the user, and wherein the method further comprises:
- capturing, by a microphone on the head-mounted device, the context; and
- transmitting, by the head-mounted device, the context to the assistance engine.

19. The method of claim 18, wherein the context is related to a location of the environment.

20. The method of claim 18, wherein the context is related to a task to be performed in the environment.

* * * * *